Figure 5:
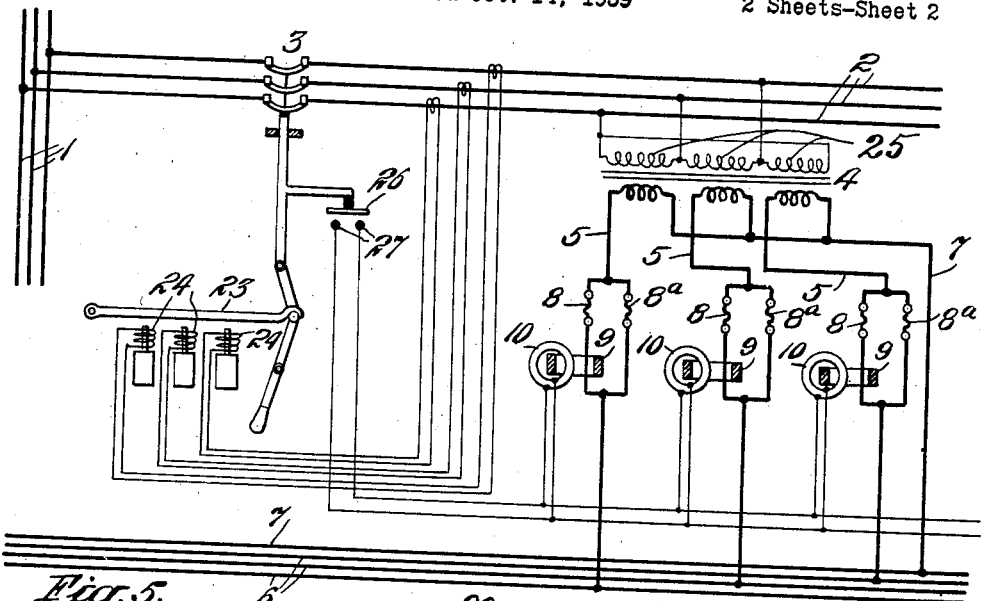

July 13, 1943.  J. D. WOOD  2,324,451
CURRENT PROTECTIVE MEANS
Filed Oct. 14, 1939   2 Sheets-Sheet 1
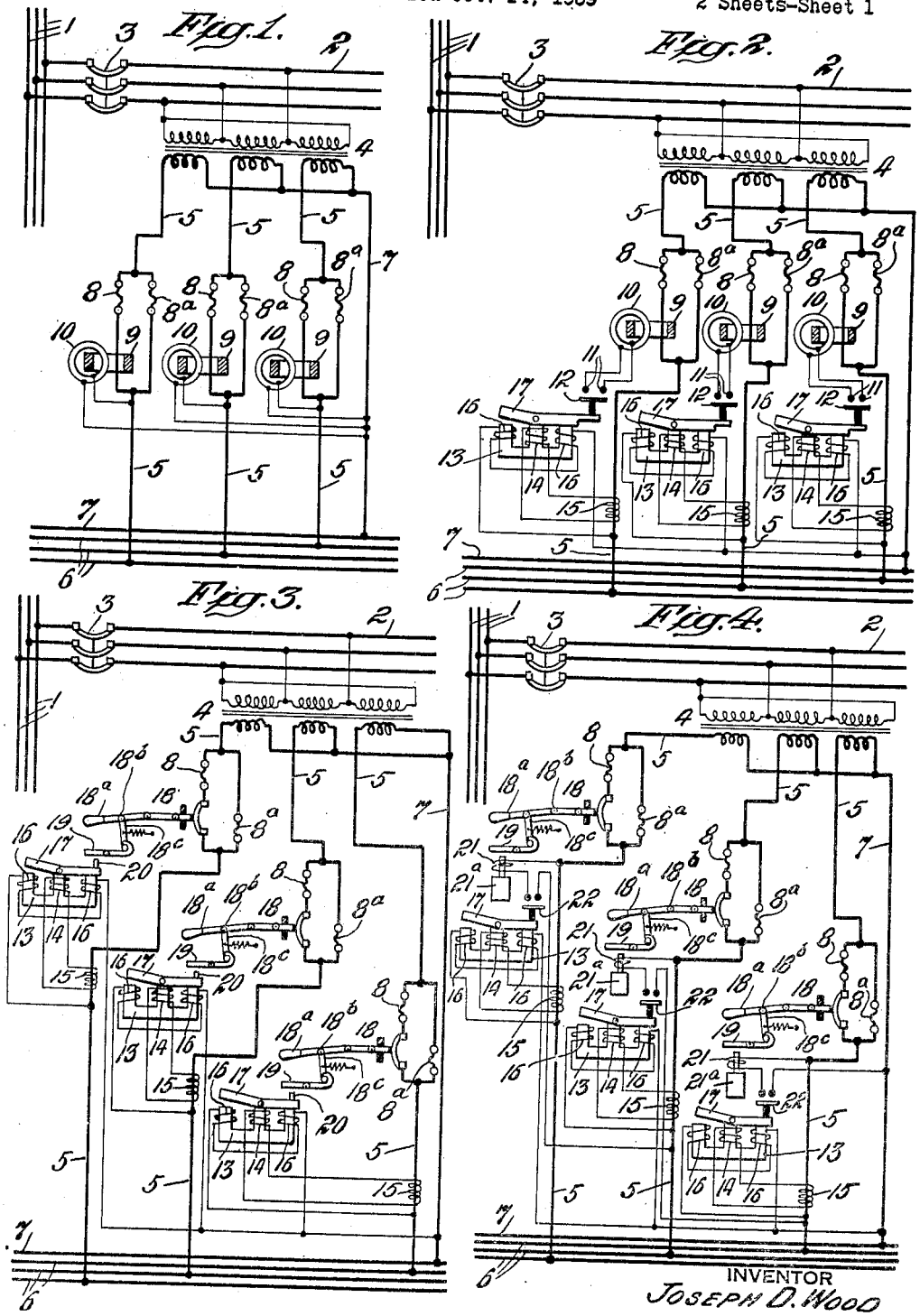
INVENTOR
JOSEPH D. WOOD
BY
Lawrence K. Sager
his ATTORNEY INVENTOR
JOSEPH D. WOOD
BY
Lawrence K. Sager
his ATTORNEY Patented July 13, 1943

2,324,451

UNITED STATES PATENT OFFICE 2,324,451

CURRENT PROTECTIVE MEANS

Joseph D. Wood, Bethlehem, Pa., assignor, by mesne assignments, to The Pennsylvania Company for Insurances on Lives and Granting Annuities, Philadelphia, Pa., a corporation of Pennsylvania Application October 14, 1939, Serial No. 299,443

2 Claims. (Cl. 175—294)

This invention is particularly applicable to cases where energy is supplied to network systems from a number of different sources and where the occurrence of a fault may cause the system to feed back in a reverse direction towards the fault. Such feed back is, of course, an undesirable drain on the network until the faulty section has been disconnected from the network. The present invention insures the interruption of the circuit and isolates the faulty section by response to the reversed direction of current. It is applicable to various other purposes and to various types of systems where it is desired to interrupt any circuit upon a reversal of the direction of current from its normal condition.

The main object of the invention is to provide simple and effective means for interruption of a circuit upon change of its direction from normal. Another object is to provide such means that will be dependable at all times. Other objects and advantages will be understood from the following description and accompanying drawings which show various embodiments thereof.

Fig. 1 is a diagram showing the invention applied to a three-phase system in the feeders to a network; Figs. 2 to 5 are similar diagrams showing various modifications; and Fig. 6 is a diagram showing one mode of applying the invention to a loop-feeder system.

Referring to Fig. 1 the lines 1 indicate the bus bars of a main station, or sub-station, supplying three-phase current to the feeder lines 2 through a circuit breaker 3. At various points along this feeder are connected step-down transformers, one of which is shown as a three-phase transformer 4 having its primary windings connected in delta and its secondary windings connected in star. From these secondaries extend the sub-feeders 5 to the network system indicated by the lines 6 which may extend over a wide area and serve as the distribution circuits. The sub-feeders and network are shown as a four-wire system comprising the three-phase lines and a neutral line 7, making two different voltages available in the distribution system.

Each of the feeders 5 is divided into two branch lines connected in parallel, each of the branches containing a fuse. Enveloping one of the branches of each feeder is an iron core 9, preferably laminated. The fuse in each of these branches is designated by the numeral 8 whereas the fuse in the branch not enveloped by the core 9 is designated as 8a. A portion of each of the cores 9 is enveloped by a winding 10. One terminal of each of these windings is connected to the neutral line 7 and the other terminal of each winding is connected to its respective feeder 5. In some cases, instead of the branch conductor of the feeder merely passing through the core 9, it may envelop the core with a few turns where desirable for increasing the inductance in the core 9 due to the branch feeder conductor.

The direction of turns of each winding 10 is made such that under normal conditions the flux produced by the winding in the core 9 will be in the same direction as that due to the branch conductor of the feeder which passes through the core; and as the alternating current reverses, the current in each winding 10 will correspondingly reverse because its voltage maintains the same relation to the current which passes through its respective branch conductor. Therefore under normal conditions the cores 9 will be cumulatively magnetized by their respective branch conductors and windings 10 during each cycle. In the form shown in Fig. 1 the phase relationship of the currents may be modified when the power factor is less than unity but for moderate departures from unity power factor the above condition is maintained approximately, resulting in the cores 9 offering comparatively low impedance to the current of each branch conductor passing through it. Therefore the current in each feeder 5 may be assumed to divide fairly equally in the two branches of each feeder and the fuses 8 and 8a may be considered to be subjected to about the same current values under normal conditions. For example, if each feeder is carrying 1000 amperes, each of the fuses 8 and 8a may be assumed to carry 500 amperes and as they are proportioned to carry jointly the full normal load, the fuses will not be opened under normal load conditions. In some cases the fuses 8 may be proportioned to carry somewhat less than half of the normal current and the fuses 8a may be proportioned to carry more than half of the normal current in order to compensate for a somewhat higher normal impedance in the circuit of the fuses 8 compared with the circuit of the other branch.

Upon the occurrence of a fault in the lines 2 or transformers 4, or in any portion of the circuit between the circuit breaker 3 and the fuses 8, 8a, there would be a feed back from the network 6 through the feeders 5 to the fault. Under any conditions which cause a reversal of the direction of current from normal through the feeders 5, the relative direction of currents in the windings 10 and in the branch conductors is reversed and this greatly increases the inductance to the passage of current through the branch conductors embraced by the cores 9. This condition results because the direction of current in the branch conductor, or conductors, reverses whereas the voltage applied to the winding or windings 10 remains the same; and whereas the relative direction of current through the branch conductors and windings 10 was normally cumulative tending to saturate the cores 9, the relative change causes the impedance in the branch conductor embraced by the core 9 to be greatly increased and the increased reactance tends to obstruct the passage of the current in that branch conductor. This causes a pronounced change in the division of the current passing through the fuses 8 and 8a and forces a much greater amount of current to pass through the fuse or fuses 8a. This pronounced change of distribution of the current between the fuses causes the fuses 8a to be subjected to such a pronounced increase of current beyond the normal capacity thereof that the overloaded fuses 8a are ruptured. This in turn forces all of the current to pass through the remaining fuses 8 and on account of this current greatly exceeding the normal capacity of the fuses 8, they will be ruptured and thereby open the circuit of each affected feeder 5. Obviously the fuses 8 and 8a will open their circuits when an overload occurs at any time but by providing the inductive choking means in one of the branches of the feeders having a much greater reactance upon reversal of feeder current, the circuits are ruptured upon reversal of the direction of current from normal when the current in the feeders 5 may be much below the rated carrying capacity of the fuses 8, 8a.

Fig. 2 shows a form of the invention wherein the change of reactance of the choking means is not affected by the power factor. In Fig. 2 the parts similarly numbered correspond to those already described. The windings 10, however, are not connected across the lines and are normally open circuited. The terminals 11 of each winding 10 are adapted to be bridged by a contact 12 operated by a reverse current relay. When the winding 10 is open, the reactance of the core 9 normally causes less current to pass through fuse 8 than through fuse 8a; and the fuses in this case are relatively proportioned to carry their proper relative amount of the total current under normal conditions. These fuses will be ruptured under normal direction of current under overload conditions when the capacity of the fuses is exceeded. The relay is shown as having a core structure 13 with three upwardly projecting legs. The middle leg is provided with a winding 14 which is subjected to current derived from a current transformer 15 in its feeder 5. The two outer legs of the relay are provided with windings 16 which are connected in series across its feeder 5 and the neutral line 7. Pivoted on the central leg is an armature 17 of angular form, the right-hand portion of which carries the contact 12 and is normally attracted to the right-hand leg of the core, as shown in the drawings. The left-hand portion of the armature is normally raised from the left-hand portion of the core. The direction of turns of the windings 16 on the outer legs of the core are relatively reversed so that under normal conditions the direction of flux due to the winding 14 and the right-hand winding 16 is cumulative through the middle and right-hand legs of the core. This tends to retain the reverse current relay in the position shown in the drawings.

Upon the occurrence of a feed back from the network, the direction of current in the series transformers 15 is relatively changed which in turn relatively changes the direction of current in the winding 14. This causes the flux of the winding 14 to act with the flux of the left-hand winding 16 instead of with the right-hand winding 16 and thereby causes the left-hand portion of the armature 17 to be attracted to the left-hand leg of the core and causes the contact 12 to engage the contacts 11 and close the winding 10 on itself. This decreases the reactance of the core 9 to the passage of current through the branch conductor enveloped by it and permits an increased portion of the feeder current to pass through the fuse 8. The overloading of this fuse and its rupture then transfers the total current to the fuse 8a and thereby ruptures it. In this manner the feeder circuits are opened upon feed back from the network, although under normal conditions the fuses will not open the feeder circuit unless subjected to overload current in the normal direction.

Instead of the apparatus of Fig. 2 working on a basis of the windings 10 being normally open as already described, the windings of the reverse current relays may be related so as to maintain the windings 10 normally closed and opened upon the occurrence of feed back. In that case the fuses 8 and 8a would be related in carrying capacity differently from the condition when the windings 10 are normally open and would be more nearly alike in carrying capacity, as the normal closure of windings 10 would offer less reactance to the passage of current in fuses 8. Upon the occurrence of feed back however, the windings 10 would be open circuited and cause a pronounced increase in reactance to the passage of current in fuses 8 which would force a large proportion of the current to pass through fuses 8a. This would cause the rupture of fuses 8a upon the occurrence of feed back which in turn would cause rupture of fuses 8 and thus open the circuit.

In Fig. 3 instead of providing choking means in one of the branches, a circuit breaker 18 is substituted in one of the branches of each feeder 5. The circuit breaker 18 is indicated as having an operating handle lever 18a pivoted at 18b and engaging a link for forming an underset toggle when the breaker is closed. An extension 18c from the handle lever is restrained in the closed position of the breaker by a pivoted latch 19. This latch is adapted to be tripped by a reverse current relay shown as of the same character as that disclosed in Fig. 2, although the armature 17 carries a projection 20 which is adapted to trip the latch 19 upon the occurrence of the feed back in the feeders. The tripping of the breaker upon the occurrence of a feed back then causes the fuse 8a to be subjected to the full current of the feeder. The fuse is unable to carry the full feeder current and therefore will open the feeder circuit upon the opening of the circuit breaker. The circuit breaker may be provided with the usual overload tripping means for protection from overload current under all conditions. The fuses 8 and 8a in the two branches may be of equal carrying capacity and afford protection from overload current when their joint carrying capacity is exceeded.

Fig. 4 is similar to Fig. 3 except that the reverse current relay instead of acting directly upon the tripping means of the circuit breaker acts indirectly to trip the breaker upon the occurrence of a feed back. In Fig. 4 the latch 19 is adapted to be tripped by a trip coil 21 having a plunger or armature 21a. The coil 21 is normally open circuited but is adapted to be closed across its feeder and the neutral line 7 when the reverse current relay is actuated by a feed back current. This relay carries a contact 22 which is adapted to close the circuit of the trip coil 21 for securing this result. The operation is similar to that described with reference to Fig. 3.

Figure 6:
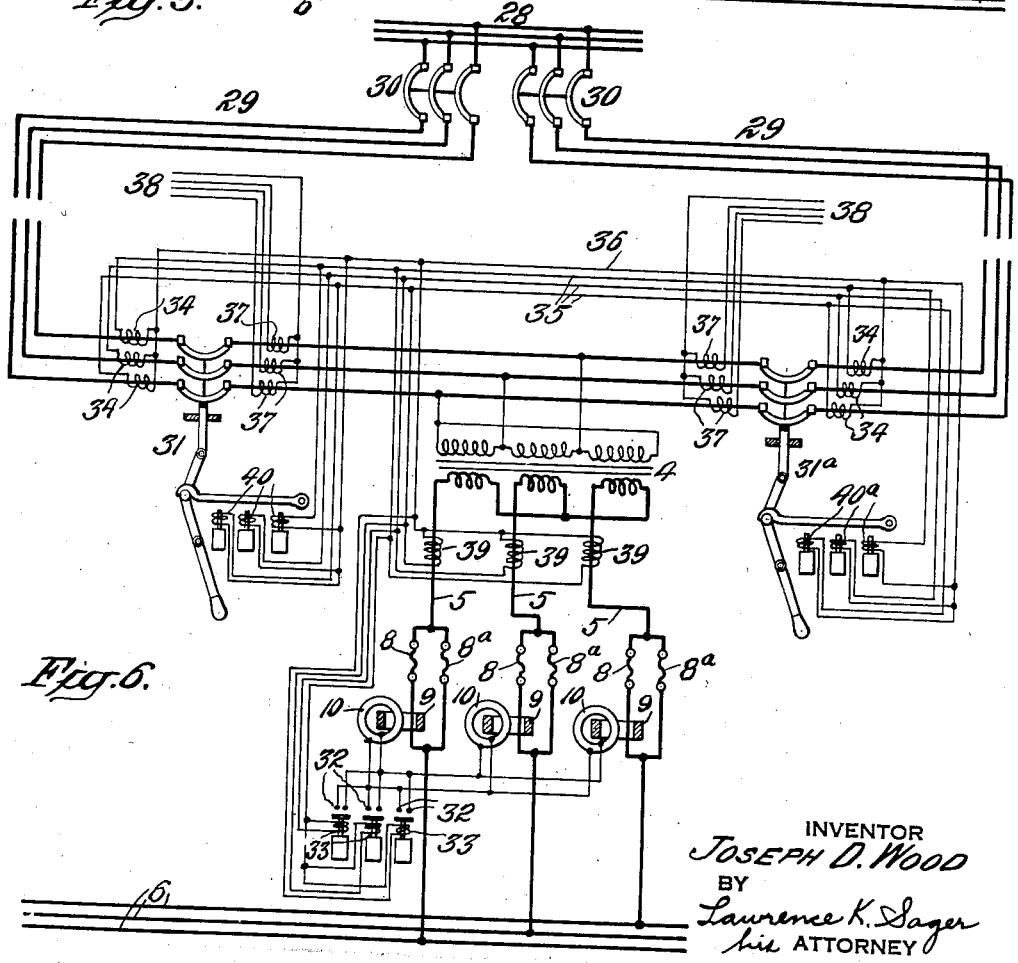

Fig. 5 is similar to the disclosure of Fig. 2 except the closing of the circuits of the coils 10 is made dependent upon the opening of the main circuit breaker 3. This breaker is shown restrained in its closed position by a latch 23, the opening of which is controlled by overload magnets 24 having their coils in series respectively with current transformer coils 25 in the respective main feeder lines 2. A movable part of the breaker carries a contact 26 and when the breaker 3 is opened, this contact bridges a pair of contacts 27. The windings 10 are connected in parallel to wires extending from the contacts 27. Under normal conditions and with the fuses 8 and 8a properly proportioned, they jointly serve to carry the full current and serve to open the feeders upon the occurrence of overload therein. Upon the occurrence of an overload either in normal direction or due to feed back in the feeders 2 or any one of them which would cause the tripping of the breaker 3, the coils 10 are thereupon short-circuited which so changes the reactance of the cores 9 as to cause the distribution of current between the fuses 8 and 8a to be greatly changed. This results in first rupturing the fuses 8 and then the fuses 8a in the manner already described. Thus the opening of the sub-feeder circuits is insured upon the occurrence of a feed back whenever the main circuit breaker opens. As already described with reference to Fig. 2, the windings 10 could be normally closed when the circuit breaker 3 is closed and opened upon the opening of the circuit breaker. In that case the fuses 8 and 8a would be proportioned relatively so that the fuses 8 would have a much less carrying capacity than the fuses 8a.

Fig. 6 shows the invention applied to a loop circuit feeder system supplying a network of the character described in United States patent of Chase granted June 23, 1925, #1,543,370. Although Fig. 6 shows only one separable section of the loop system and one set of sub-feeders to the network, it will be understood that the loop may include additional sections supplying additional sub-feeders to the network. The station bus bars are shown at 28 supplying the loop feeders 29 through a pair of circuit breakers 30, the loop feeders being opened at two points to indicate inclusion of additional loop sections. Another pair of circuit breakers 31, 31a are in the loop circuit and adapted when opened to isolate the section of the loop between the breakers. This section of the loop is shown connected to a polyphase transformer 4 which supplies feeders 5. These feeders contain branch circuits and fuses 8, 8a as already described, as well as the cores 9 and the windings 10. The windings 10 are connected in parallel to a circuit having sets of terminals 32. These sets of terminals are adapted to be bridged respectively by contacts of three relays 33. When the contact of any one of these relays is actuated to engage a pair of contacts 32, it will close the circuits of each of the windings 10.

On the outside of the circuit breakers 31, 31a in each of the feeders in the adjoining loop sections are current transformers 34 which are connected respectively to the three-phase lines 35 and neutral line 36. At the inside of each circuit breaker 31, 31a in each of the feeders of the loop section shown are current transformers 37 which are connected respectively to the lines 38 indicated as extending for the control of adjoining loop sections. In the sub-feeders 5 are similar current transformers 39 which are connected respectively to the three-phase lines 35 and neutral 36. The ampere turns of the current transformers 34 and 39 are such as to give balanced potentials in the lines 35 under normal current conditions. From each of the lines 35 and 36 circuits extend respectively to the three trip coils 40 and 40a respectively controlling the loop circuit breakers 31, 31a, these coils being connected in common to the neutral line 36. A similar connection is made from the lines 35 and 36 to the three windings of the relays 33.

Under normal conditions of current distribution, and normal potential conditions in the trip coils 40, 40a and coils of relays 33, the approximately balanced condition is not sufficent to actuate the plungers of these coils; but when a fault occurs the unbalanced current distribution in the current transformers causes an unbalancing of potential in the control circuits and results not only in tripping the circuit breakers 31, 31a but also in closing one or more sets of contacts 32. This short-circuits the windings 10 which so decreases the reactance of the choking units that the fuses 8 are subjected to an increased proportion of the current causing them to burn out which in turn throws the full current of the sub-feeders on the fuses 8a which then rupture and thereby open the circuit of the sub-feeders. Thus the transformer 4 and the loop section are isolated from the network system as well as from other portions of the loop circuit. Instead of utilizing the unbalancing of the potentials applied to the relays 33 for controlling the circuits of the windings 10, the form of control of these windings as shown in Fig. 1 might be used in the sub-feeder circuits, or any other one of the forms of control already described.

It is evident that the invention may be embodied in various forms of controlling apparatus and modified in various ways for adaptation to particular requirements without departing from the scope of the invention. Instead of using fuses for interrupting the current in the branches, or parallel paths, of the feeder circuits, any other suitable form of overload circuit interrupting device may be utilized having capacities or adjustments relatively proportioned to first open one branch and then the other upon feed back or change of direction of current from normal, while their joint capacities serve to protect against overload at all times.

I claim:

1. Current protective means for a circuit comprising a division of the circuit in two parallel paths, overload circuit interrupting means in each of said paths, inductive means related to the circuit of one of said paths, said inductive means having a winding normally supplied with current acting cumulatively with the current in the circuit of said one of said paths and in opposition thereto upon reversal of the normal direction of current in said path for producing pronounced unbalancing of the current in said two paths and thereby causing the successive opening of said interrupting means in each path.

2. The combination of a network system, feeders supplying said network, said feeders being divided in parallel paths, circuit interrupting means in said paths, a circuit interrupter in the circuit supplying energy to said feeders, inductive means related to the circuit of certain of said paths, and means responsive to the opening of said circuit interrupter for changing the reactance of said inductive means for producing pronounced relative change of the current in said paths and thereby cause the successive opening of said circuit interrupting means.

JOSEPH D. WOOD.